United States Patent [19]

Mike

[11] Patent Number: 4,493,652

[45] Date of Patent: Jan. 15, 1985

[54] INSPIRATIONAL TEACHING APPARATUS

[76] Inventor: Nettie Mike, Rte. 4, Box 66B, Hammond, La.

[21] Appl. No.: 487,022

[22] Filed: Apr. 21, 1983

[51] Int. Cl.³ .................. G09B 19/00; G09F 19/00
[52] U.S. Cl. ...................... 434/245; 40/436
[58] Field of Search .............. 434/245; 40/427, 436, 40/437, 442, 443, 444

[56] References Cited

U.S. PATENT DOCUMENTS

| | | | |
|---|---|---|---|
| 926,956 | 7/1909 | McComb | 40/444 |
| 2,072,018 | 2/1937 | Ashe | 40/436 |
| 2,310,738 | 2/1943 | Johnston | 434/245 |
| 3,078,593 | 2/1963 | Miller | 434/309 |
| 3,289,319 | 12/1966 | Kiehl | 434/245 |
| 3,708,893 | 1/1973 | Murphy | 434/343 |
| 3,806,722 | 4/1974 | Peake et al. | 40/444 |
| 3,888,024 | 6/1975 | Elliott | 434/310 |

*Primary Examiner*—William H. Grieb
*Attorney, Agent, or Firm*—Pravel, Gambrell, Hewitt, Kirk & Kimball

[57] ABSTRACT

An apparatus and method for teaching a person inspirational phrases. The method comprises a visual display of an inspirational symbol which imparts a sensation of movement towards the person via a steady increase in overall dimension. When the inspirational symbol had attained maximum dimension the words of an inspirational phrase are illuminated below. Simultaneously, an audio track reads aloud the displayed inspirational phrase. The apparatus comprises: shutters which pivotally open and slide into a housing revealing an exhibiting area for showing an inspirational symbol; a display area for exhibiting inspirational phrases; an audio system to broadcast the displayed inspirational verses; and an operating system for changing the displayed inspirational verses in conjunction with the audio system.

9 Claims, 5 Drawing Figures

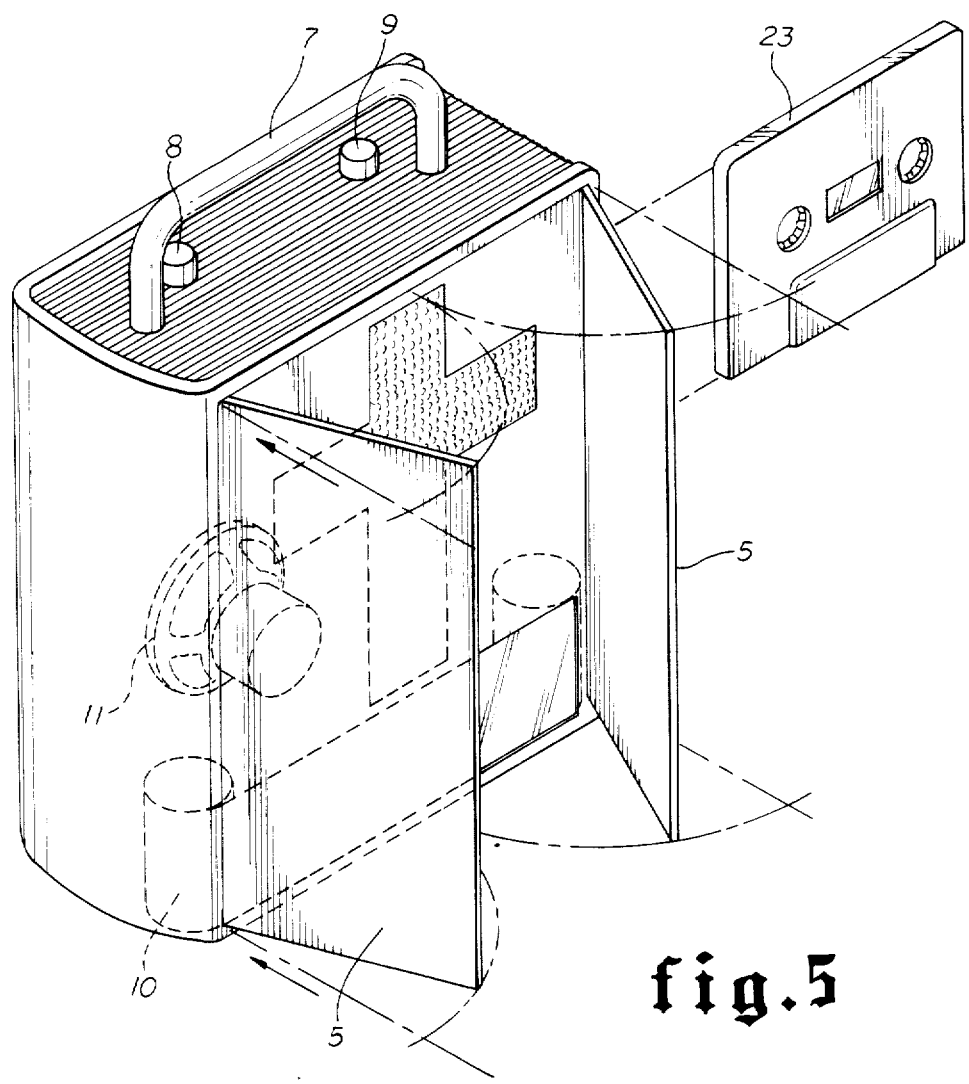

INSPIRATIONAL TEACHING APPARATUS

TECHNICAL FIELD OF THE INVENTION

This invention relates to a method and apparatus for teaching a person a variety of inspirational phrases.

BACKGROUND OF THE INVENTION

A common method to teach a person to remember short phrases is to have that person read a phrase followed by an instructor reading the phrase out loud. Since an instructor may not always be available, various devices have been developed to allow a student to practice independently. While prior art devices can be effectively be used for independent study in a wide range of topics, the apparatus and method which is the subject of this invention is particularly suited for study of inspirational phrases. Undoubtedly, it is vital to capture the students' attention and imagination in order for the learning experience to be effective. One of the novel features of the invented device is its ability to attract the typical students' attention as well as orient his thoughts in an inspirational direction.

Various types of educational teaching devices abound in the prior art. One group of prior art can be classified as purely visual. These include C. O. Johnston, U.S. Pat. No. 2,301,738 dated Feb. 9, 1943 which features a mock-up of a cathedral wherein cards displaying religious scenes can be inserted. Murphy U.S. Pat. No. 3,708,893 dated Jan. 9, 1973 features doors that open to reveal a scene when preselected cards are inserted in the appropriate order. Another device, Elliott U.S. Pat. No. 3,888,024, features manually operated shutters as well as an audio visual display featuring a picture and words describing said picture. It is clear that the prior art does not disclose an educational apparatus particularly suited for teaching inspirational verses which incorporates shutters that open automatically to reveal a seemingly mobile inspirational symbol coupled with a visual display and an audio voiceover.

SUMMARY OF THE INVENTION

It is therefore an object of the invention to provide a method and apparatus for teaching a person inspirational phrases.

Another object of the invention is to facilitate learning of inspirational phrases by giving the student the option to see the same phrase while having a voiceover announce the words of the phrase as often as necessary.

It is yet another object of the invention to provide a durable and compact apparatus which can be carried anywhere and thus frequently used by the prospective pupil.

In a preferred embodiment, the pupil activates the apparatus by pushing a button. Operable shutters on the front of the apparatus pivot open and disappear by sliding into housing of said apparatus. At that point there commences a visual depiction of an ever growing inspirational symbol thus giving the appearance of motion toward the viewer. When said inspirational symbol has reached maximum proportions the words to an inspriational phrase are illuminated below. A sound track is activated to read the words of the illuminated phrase. The pupil may elect to hear the phrase read repetitively on the sound track or push a button which will change the displayed inspirational phrase and the corresponding voiceover. At the end of a given learning session, the pupil may push a button thereby terminating the displayed inspirational phrase and inspirational symbol which in turn causes the operable shutters to emerge from the housing and close over the front of the apparatus.

BRIEF DESCRIPTION OF THE DRAWINGS

These objects and other features and advantages of the invention will become apparent upon reading the detailed description of a preferred embodiment of the invention as described below and illustrated in the drawings wherein:

FIG. 5 is an isometric view of the apparatus illustrating shutter operation.

DETAILED DESCRIPTION OF A PREFERRED EMBODIMENT

Figure 1:
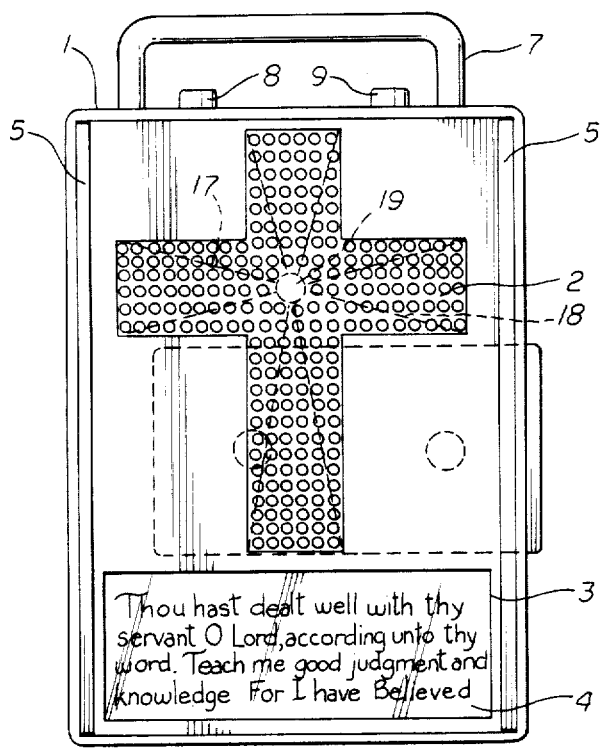
FIG. 1 is a front view of the apparatus according to this invention.

The apparatus shown in FIG. 1 has two pivotally and slidably connected shutters 5 shown here in the fully opened and retracted position. The front of the apparatus comprises of an inspirational symbol display area 2 and an inspirational phrase display area 3. A handle 7 is provided for transporting the apparatus. On-off button 8 is used to activate and turn off the apparatus and advance button 9 is used to advance the displayed inspirational messages. Film strip 4 appears within inspirational phrase display area 3.

Figure 2:
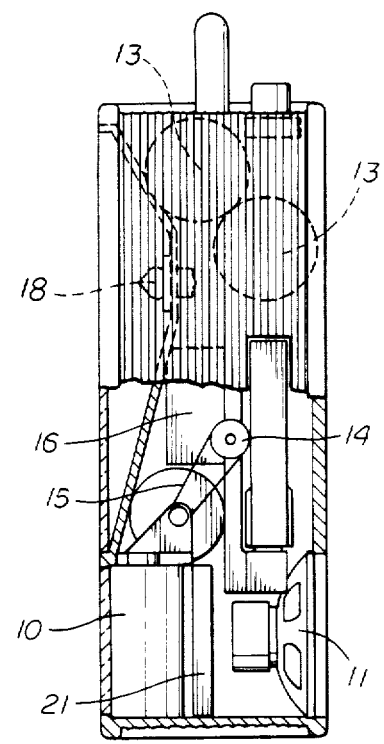
FIG. 2 represents a section view of the apparatus showing the internal arrangements of its various component systems.

As shown in FIG. 2 with reference to FIG. 1, a series of light bulbs 18 are arranged along paths 17 and all of said paths 17 originate from a central focal point 19. Pivotally and slidably connected shutter 5 is shown in the closed position covering the front of said apparatus. The system control components 16, which are well known in the art, are centrally located within the apparatus. Operating power from the apparatus comes from an electrical source 13 which is comprised of four six volt batteries. The film strip 4 is advanced by drive motor 14 through drive means 15. Speaker 11 is used to announce the displayed inspirational phrase.

Figure 3:
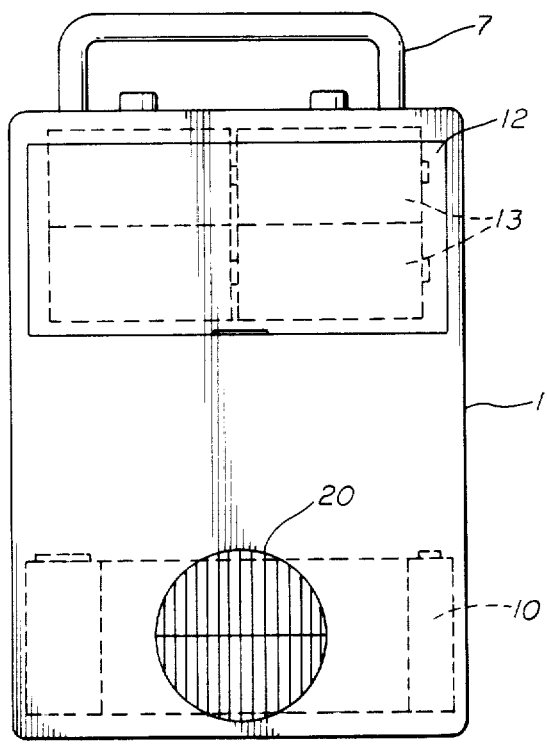
FIG. 3 is a back view of the apparatus according to this invention.
Figure 4:
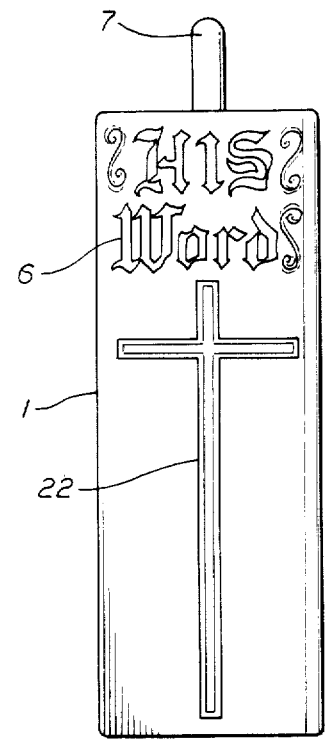
FIG. 4 is an alternate side view of the apparatus illustrating typical exterior marks.

FIG. 3 illustrates the location of battery cover 12 on said apparatus. Words broadcast from speaker 11 emerge through grill 20. FIG. 4 shows a side view of the apparatus illustrating a typical inspirational message 6 and an inspirational symbol 22 that can be used to reinforce the object of the invented apparatus. FIG. 2 shows the relative position of the film strip cartridge 10 and back-lighting means 21. A preselected phrase on film strip 4 is shown in inspirational phrase display area 3 when backlighting means 21 illuminates the film strip 4 through an opening in said film strip cartridge 10 (not shown). FIG. 5 is an isometric view illustrating the relative positions of handle 7, on-off button 8 and advance button 9.

The apparatus is operated in the following manner. The student pushs on-off 8 which activates the pivotally and slidably connected shutters 5. Said shutters swing open and slide into housing 1. A series of lights 18 radially disposed about central focal point 19 along a plurality of paths 17 are lit sequentially thereby allowing an inspirational symbol of ever increasing dimension to appear within the inspirational symbol display area 2. When the inspirational symbol has reached maximum dimensions back-lighting means 21 are illuminated thereby displaying an inspirational message located on film strip 4 within the display area 3 on the front of the apparatus. The system control components 16 then activate a voiceover which is broadcast through speaker 11. The voiceover repeats the displayed inspirational phrase until the pupil pushes advance button 9 which advances film strip 4 and results in a different inspirational phrase being displayed in display area 3. The control system components 16 automatically advance the voiceover to read the presently displayed inspirational phrase. At the end of a learning session, the apparatus is turned off by pushing on-off button 8. At that time, the system control components 16 cut off power to lights 18 and back-lighting means 21 thereby terminating the display of the inspirational symbol and the inspirational phrase on the front of the apparatus. Simultaneously, shutters 5 slide out of housing 1 and pivot over the front of the apparatus.

While various embodiments of the invention have been illustrated and described in detail, it is understood that changes may be made without departing from the spirit of the invention or the scope of the appended claims. For instance, the apparatus may be used to display inspirational phrases relating to a multitude of demoninations or phrases of a patriotic nature. The voiceover may be changed by selecting an appropriate cassette 23. It is also understood that the electronically displayed inspirational symbol can be modified to comport with the theme of the illustrated inspirational phrase.

I claim:

1. A device for teaching a person inspirational verses comprising:

a housing;

shutters pivotally connected to said housing;

exhibiting means mounted in said housing behind said shutters for showing a seemingly mobile inspirational symbol upon opening of said shutters;

display means located behind said shutters for exhibiting a selected one of a plurality of inspirational phrases;

audio means in said housing to verbalize said displayed inspirational phrase; and system control means for changing from said selected displayed inspirational phrase to another inspirational phrase, for closing and opening said shutters, for exhibiting said inspirational symbol, for displaying said inspirational phrase, and for actuating said audio means.

2. The device as described in claim 1, wherein said display means comprises a backlit film strip contained in a cartridge.

3. The device as described in claim 2, wherein said exhibiting means comprises a plurality of sets of light bulbs concentrically disposed with respect to each other to define an inspirational symbol of progressively increasing size.

4. The device as described in claim 3, wherein said operating means comprises an electric motor to advance said film strip.

5. The device as described in claim 4, wherein said operating means comprises a plurality of control buttons to activate said shutter means, said groups of light bulbs, said film strip and said audio means in a predetermined sequence.

6. The device as described in claim 5, wherein said shutters are slideably connected to said housing allowing said shutters to retract into said housing upon pivoting open.

7. The device as described in claim 7, wherein said inspirational symbol comprises a crucifix.

8. A method for teaching people inspirational phrases comprising the steps of:

opening shutters to actuate an electronically displayed inspirational symbol;

electronically displaying a progressively enlarging inspirational symbol to give a viewer the impression of movement;

after enlargement of said inspirational symbol has commenced, actuating a visual display of words forming an inspirational phrase; and audibly announcing said displayed words.

9. The method described in claim 8, wherein the operator can retain said displayed inspirational phrase and repeat said corresponding audible announcement.

* * * * *